ANGULAR MOVEMENT TRANSMITTING DEVICE
Filed Jan. 2, 1957 2 Sheets-Sheet 1
Fig. 1
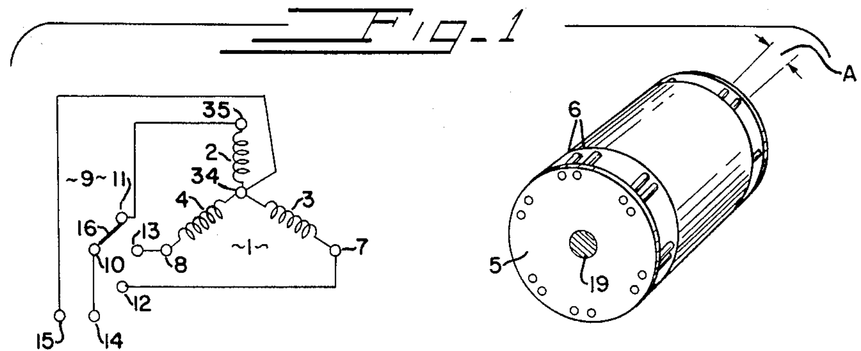
Fig. 2
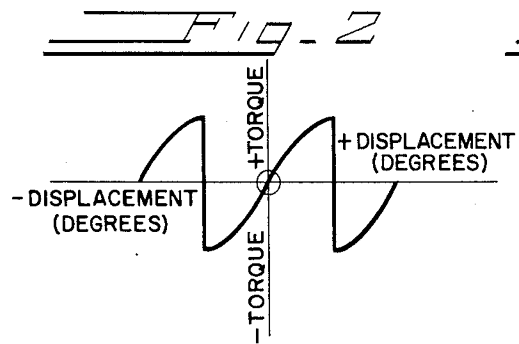
Fig. 3
| SWITCH POSITION | ROTOR POSITION |
|---|---|
| 10-11 | 0 DEGREES |
| 10-13 | 20 " |
| 10-12 | 40 " |
| 10-11 | 60 " |
| 10-13 | 80 " |
| 10-12 | etc " |
Fig. 4
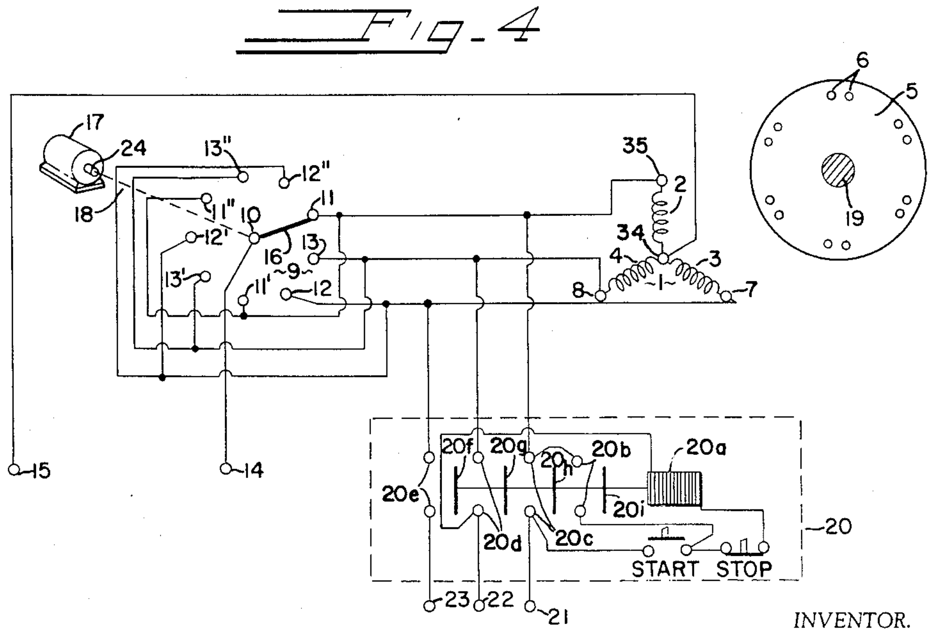
INVENTOR.
SAMUEL NOODLEMAN
BY
DES JARDINS AND ROBINSON
By Clarence B. Des Jardins
HIS ATTORNEYS Nov. 1, 1960 S. NOODLEMAN 2,958,812

ANGULAR MOVEMENT TRANSMITTING DEVICE

Filed Jan. 2, 1957

2 Sheets-Sheet 2

INVENTOR.
SAMUEL NOODLEMAN
BY
DES JARDINS AND ROBINSON
By Clarence B. Des Jardins
HIS ATTORNEYS 2,958,812

ANGULAR MOVEMENT TRANSMITTING DEVICE

Samuel Noodleman, Cincinnati, Ohio, assignor to The B. A. Wesche Electric Company, Cincinnati, Ohio, a corporation of Ohio Filed Jan. 2, 1957, Ser. No. 632,217

11 Claims. (Cl. 318—27)

This invention relates to improvements in angular movement transmitting devices and in the components thereof, and, more particularly, to movement transmitting devices in which the receiver comprises a novel stepping-type motor having a stator provided with a polyphase multi-pole winding which, in certain embodiments of the invention, permits the device to be operated in a dual capacity either as a conventional alternating current motor or, by energizing particular portions of the stator winding with single phase alternating current, the device is operable either as a stepping motor or as a slow-speed or variable-speed alternating current motor. The rotor of the receiver motor includes a squirrel-cage type of rotor construction with the rotor bars arranged in a particular way, as will hereinafter be more fully described. As used herein, the term polyphase means three or more phases.

It is an object of the present invention to provide an angular movement transmitting device of new and improved design.

Another object of the invention is to provide an angular movement transmitting device which is also capable of operation either as a slow-speed alternating current motor or as a variable-speed alternating current motor.

A further object of the invention is to provide a device of the character described which is relatively easy and economical to manufacture as well as economical in operation.

Another object of the invention is to provide a device of the character described which is susceptible of operation either as a conventional alternating current motor or as an angular movement transmitting device.

Figure 5:
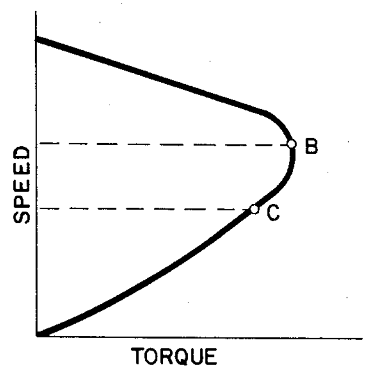
Figure 6:
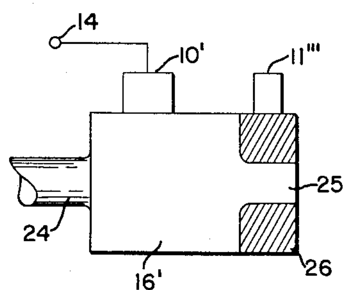
Figure 7:
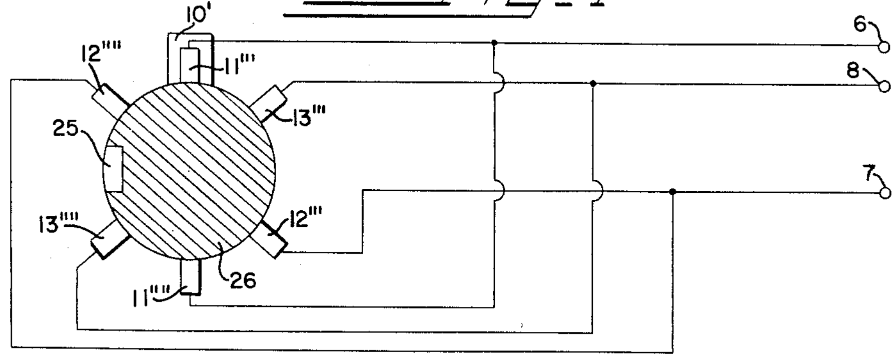
Figure 8:
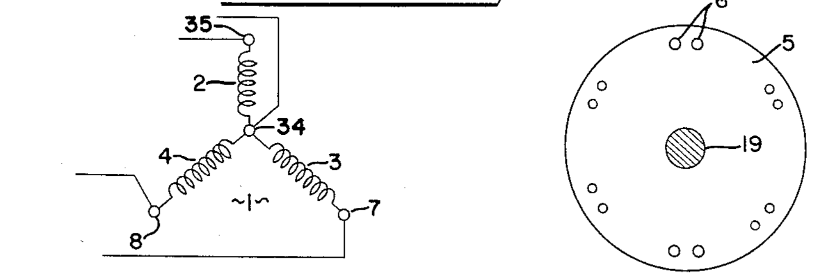
Figure 8:
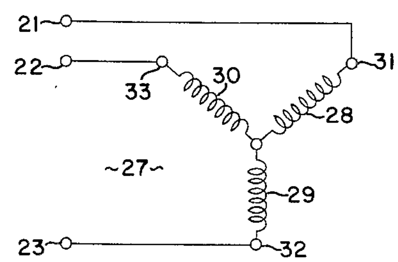

Other objects and advantages will become apparent to those skilled in the art from the following description of preferred forms or embodiments of the invention, taken in connection with the accompanying drawings in which Fig. 1 is a schematic view showing a six-pole embodiment of the invention; Fig. 2 is a graph showing the variation of torque as a function of rotor displacement; Fig. 3 is a table showing the relationship between switching means position and rotor position; Fig. 4 is a schematic view showing a modified embodiment of the device shown in Fig. 1; Fig. 5 is a graph showing the torque-speed characteristic; Figs. 6 and 7 are front and side elevations, respectively, of a modified embodiment of the switching means shown in Figs. 1 and 4 with certain wiring connections being shown only in part and omitted in other cases in the interest of clarity; and Fig. 8 is a modified embodiment of the arrangement shown in Fig. 4.

Similar reference characters designate similar or identical elements and portions throughout the specification and throughout the different views of the drawings.

As hereinbefore indicated, the present invention relates to a remote control type of angular positioning device which includes a contact type of transmitter or switching means and a step-by-step type of receiver. Where a stepping type of movement is desirable or necessary such as in indexing heads or turrets, or in tape controlled devices for machine tools, etc., a movement transmitting device embodying the present invention should find ready acceptance because of its relatively simple construction and its low manufacturing cost. A device embodying the present invention possesses additional virtues because of its versatility which permits its operation either as a conventional alternating current motor, or as a movement transmitting device, or as a variable speed or a slow speed alternating type of motor.

While particular types of stator windings and rotor arrangements are illustrated in the accompanying drawings, it will be readily understood from the following description that other winding arrangements and/or rotor constructions may be utilized to provide a different number of steps to the rotor per revolution thereof. For any particular stator winding design, the angle of one step of the rotor expressed in degrees equals $360/(p \times P)$, where $p$ equals the number of phases provided in the stator winding and P equals the number of poles. Thus, for a three-phase stator winding, as illustrated in the accompanying drawings, the step angle is 20 degrees.

A six-pole, three-phase embodiment of the invention providing 20 degree steps of the rotor is illustrated in Figs. 1, 4, and 8. As previously indicated, any number of different combinations of multipole, polyphase winding combinations may be employed to secure whatever stepping angle may be desired so long as appropriate modifications are made to the rotor structure as will hereinafter be more fully described.

The device operates on the principle of substantially zero or minimum current flow in the bars or conductors of a squirrel-cage rotor, more fully described in my co-pending application Serial No. 632,218, filed January 2, 1957, assigned to the same assignee as the present application.

Referring now to Fig. 1 and Fig. 4, I provide a multi-pole polyphase stator winding indicated generally at 1 having individual coils 2, 3, 4, which are wound in a well-known manner to provide two or more poles. As illustrated in Figs. 1, 4, and 8, stator coils 1 are shown as a three-phase winding wherein individual coils 2, 3, and 4 are each wound to provide six poles.

The rotor 5 is of the squirrel-cage type and is constructed in a manner described with greater particularity in the above-mentioned co-pending application, Serial No. 632,218, filed January 2, 1957, with one rotor bar or one group of rotor bars corresponding to each pole of the stator winding. For purposes of illustration, it is assumed that each of coils 2, 3, 4 provides six poles and therefore the rotor bars are shown arranged in six equally spaced groups with two rotor bars per group. It is desirable, although not absolutely necessary, to provide skewing of either the rotor or the stator slots to insure that the torque curve (Fig. 2) will pass smoothly through zero with no step or jog. As is best shown in Fig. 1, the skewing is indicated by the angle A as applied to the rotor bars 6.

In Figs. 1, 4, and 8 the stator coils are shown connected in a conventional Y-connection with one end of coils 2, 3, and 4 connected to a common terminal 34. The opposite end of coils 2, 3, and 4 is connected, respectively, to terminals 35, 7, and 8.

I provide switching means, indicated generally at 9, having a common terminal 10 and a plurality of additional terminals 11, 12, and 13 which are connected, respectively, to terminals 35, 7, and 8 (Fig. 1) to permit selective energization of one of the coils, 2, 3, or 4 by an operator who can energize a particular coil by placing the switching means 9 in a particular position. Said coils are energized from a suitable source of alternating current single-phase electrical energy (not shown) by means of terminals 14, 15 which are adapted to receive energy from said source and which are connected, respectively, to terminals 10 and 34.

In operation, with terminals 14, 15 connected to a suitable source of single-phase energy and with switching means 9 in the position shown in Fig. 1, coil 2 is energized and coils 3 and 4 are not energized. Therefore, rotor 5 will orient itself in a particular position which is determined by the magnetic field established by coil 2 so that the rotor bars 6 carry substantially zero current and the rotor will tend to remain "locked" in such position. In other words, the device operates in the manner described in the above-mentioned co-pending application Serial No. 632,218, filed January 2, 1957.

If the operator now moves switching means 9 from the position indicated in Fig. 1 to interrupt the connection between the terminals 10 and 11 and establish connection between terminals 10 and 13, coil 2 becomes de-energized and coil 4 is energized. The effect of de-energizing coil 2 and energizing coil 4 is to shift the position of the magnetic poles established by winding 1 relative to rotor 5 by an amount equal to 20 degrees. Since rotor 5 was previously oriented relative to the field established by coil 2, it is 20 degrees "out-of-position" upon energization of coil 4 so that instantaneously rotor bars 6 are caused to carry current which in turn produces a torque causing rotor 5 to re-orient itself to the new position called for by energization of coil 4 in which new position the rotor bar 6 will again carry zero or substantially zero current. A typical torque characteristic of the device in terms of displacement of the rotor is shown in Fig. 2. In a like manner, the rotor is caused to shift an additional 20 degrees if the operator changes the position of switching means 9 to interrupt the connection between the terminals 10 and 13 and establish connection between terminals 10 and 12, thereby de-energizing coil 4 and energizing coil 3. If the operator should cause switching means 9 to rotate in a clockwise direction whenever it is moved, relative to terminal 10, so that after connection which is established is again between terminals 10 and 11, rotor 5 will always move in the same relative angular direction in 20 degree steps as is illustrated in the table of Fig. 3. Likewise, if switching means 9 is moved in a counterclockwise direction, rotor 5 will move counterclockwise in 20 degree steps. It will be understood, however, that the steps between particular rotor positions may be greater or larger depending upon the number of poles and number of phases employed as previously indicated.

Referring now to Fig. 4, a modified embodiment of the invention is illustrated which is identical with Fig. 1 except that switching means 9 is provided with additional terminals 11′, 12′, 13′, 11″, 12″ and 13″. Terminal 11 is connected to terminals 11 and 11″, terminal 12 is connected to terminal 12′ and 12″, and terminal 13 is connected to 13′ and 13″. In addition, means are provided for driving the movable element 16 of switching means 9. Such means include a motor 17 connected to movable element 16 by any convenient and well-known connecting or coupling means indicated by the broken line 18.

In the embodiment of the invention illustrated in Fig. 4, motor 17 may conveniently be a direct current motor which need provide only sufficient power for driving the switching means 9. Thus the motor can be relatively small, and, as is well-known the flexibility of control of D.C. motors readily permits constant speed operation at relatively fast or slow motor speeds, or, if desired, motor 17 can be driven at variable speed. When terminals 14 and 15 (Fig. 4) are connected to a suitable source of single-phase alternating current energy and switching means 9 is driven by motor 17 either at a constant or at a variable rate of speed, rotor 5 will follow the movement of motor 17 and element 16 of the switching means in the manner previously described in connection with Fig. 1 and according to the schedule shown in Fig. 3. Rotor 5 is connected to a load which may be a shaft 19, which shaft will either be positioned or caused to rotate in accordance with the movement of the squirrel-cage rotor 5. Thus it will be seen that my improved device may be used either as a positioning means or as an alternating current motor, thereby utilizing the advantages of an alternating current device as a prime motor or power supplying device and at the same time obtain slow or variable speeds with the flexibility of control which is normally associated with direct current machinery. As noted heretofore, driving motor 17 is small since it supplies only sufficient power to rotate switching means 9 and thus the cost and complexity of my improved device are greatly reduced and at the same time the advantages of flexibility for variable speed operation are achieved.

Another important feature of the present invention lies in the fact that in many instances winding 1 will serve in a satisfactory manner as a three-phase winding for an induction motor and, likewise, rotor 5, constructed in accordance with the invention, will act cooperatively with winding 1 so that the device will function as a conventional three-phase squirrel-cage induction motor if terminals 35, 7, and 8 are connected to a suitable source of polyphase electrical energy. This is accomplished by connecting terminals 35, 7, and 8 in series relationship with a well-known type of starter 20 for polyphase motors to terminals 21, 23, and 22, respectively, which are adapted to be connected to any suitable source of polyphase electrical energy (not shown).

Still referring to Fig. 4, when it is desired to operate my improved device as a polyphase induction motor, terminals 14 and 15 are disconnected from the abovementioned source of a single-phase electrical energy and polyphase electrical energy is supplied to terminals 21, 22, 23 and, by operating starter 20, energizes winding 1. Starter 20 is of well-known construction comprising a coil **20*a*, a plurality of pairs of contacts 20*b*, 20*c*, 20*d*, 20*e*, which are normally open and which are closed by a plurality of elements 20*f*, 20*g*, 20*h*, 20*i* which move to the left to close their associated pair of contacts when coil 20*a* is energized. When it is desired to operate the device as a stepping motor, the device is disconnected from the source of polyphase electrical energy, again by operating starter 20 to de-energize winding 1, and terminals 14 and 15** are connected to a suitable source of single phase electrical energy by well-known switching means which forms no part of the present invention and therefore is not shown.

Fig. 5 shows a typical torque-speed characteristic of a single phase induction motor. It will be noted that torque increases with speed from zero up to point B above which the torque decreases with further increases in speed. During normal operation, the single phase induction motor operates at speeds above point B. When the device shown in Fig. 4 or Fig. 8 is operated as a stepping motor and switching means 9 is driven, for example, by a motor 17, the switching means 9 should at all times be driven at a speed less than point C (Fig. 5) which is less than the speed corresponding to point B of Fig. 5 so as to avoid the possibility of operation as a single phase induction motor. In general, point B usually occurs at a minimum speed which is approximately 70 percent of the synchronous speed of the single phase induction motor. Thus, for example, assuming that the frequency of the single phase electrical energy supplied to winding 1 is 60 cycles per second, synchronous speed is 1200 r.p.m. and a speed corresponding to point B of Fig. 5 would be approximately 840 r.p.m. in the six-pole embodiments shown in Figs. 1, 4 and 8.

The switching means 9 illustrated in Figs. 1 and 4 may tend to wear unduly in operation if driven by a motor since some degree of impact is necessarily involved when driven element 16 engages a particular terminal 11 or 12, etc. If desired, switching means 9 may be replaced by an arrangement, illustrated in Figs. 6 and 7, in which a slip-ring type of device is utilized to avoid impact. As illustrated in Figs. 6 and 7, switching means 9 comprises a slip-ring type of element 16′ connected to a shaft 24 which conveniently may be the shaft of motor 17. A slip-ring brush 10′ engages slip ring 16′. Slip ring 16′ has an axially extending segment 25 which upon rotation of slip ring 16′ will engage successively a plurality of brushes 11‴, 13‴, 12‴, 11⁗, 13⁗ and 12⁗, etc., best shown in Fig. 7. Suitable insulation material 26 is secured to slip ring 16′ in any convenient manner, the diameter of insulation material 26 being equal to that of slip ring 16′ except for a cut-out portion to receive the axially extending segment 25.

Since the periphery of segment and the periphery of the insulation material 26 are both at the same diameter, brushes 11‴, etc., will ride on either of said peripheries without undue disturbance or impact on the brushes.

Only brushes 10′ and 11‴ have been shown in Fig. 6, the remaining brushes previously described being omitted from this figure in the interest of clarity. Likewise, the electrical connection between terminal 14 and brush 10′ is shown only in Fig. 6, and the wiring connections between all brushes, and terminals 35, 7, 8 are shown only in Fig. 7, brush 10′ being omitted in the interest of clarity. If the switching means of Fig. 4 is replaced by the switching means of Figs. 6 and 7, and assuming clockwise rotation of slip ring 16′ and segment 25 in Fig. 7, coils 2, 3, 4 will be energized successively upon rotation of segment 25 when electrical energy is supplied to terminals 14 and 15.

The embodiment illustrated in Fig. 8 is a modification of that shown in Fig. 4 which modification is useful when separate windings may be desirable in cases where stepping requirements dictate a particular phase and pole relationship which would not be suitable for obtaining polyphase induction motor performance that may be desired. In the embodiment shown in Fig. 8, coils 2, 3, and 4 are windings provided for step motor operation, and in this embodiment, there is also provided a separate stator winding indicated generally at 27 which is any desired type of polyphase stator winding for induction motor operation, and is illustrated as comprising coils 28, 29, 30. Winding 27 is shown as a three-phase, Y-connecting winding having terminals 31, 32, and 33, which terminals are connected, respectively, to terminals 21, 22, and 23. In Fig. 8, starter 20 has been omitted for reasons of clarity. It will be understood that stator winding 27 may be replaced, if desired, with a delta-connected three-phase winding, a two-phase winding, or any other desired type of polyphase stator winding.

Operation of the device illustrated in Fig. 8 is substantially the same as for that shown in Fig. 4. When induction motor operation is desired, winding 27 is energized with polyphase electrical energy supplied from terminals 21, 22, and 23 and winding 1 is not energized. When it is desired to operate the device as a stepping motor or as a follower of the motion of motor 17, winding 27 is not energized and single-phase electrical energy is supplied to winding 1 from terminals 14 and 15 in the manner previously described in connection with Fig. 4. As noted heretofore, in order to avoid a tendency to "pull-out-of-step" and to operate as an induction motor, the speed at which switch means 9 is driven should be restricted to a rotational speed C (Fig. 5) that is less than approximately 70 percent of synchronous speed corresponding to the frequency of the single phase energy supplied to and the number of poles of coils 2, 3 and 4.

Thus it will be seen that I have provided a novel and improved type of motor which is capable of induction motor operation or may be operated as a stepping type motor, or may be utilized as a slow-speed or variable-speed type of alternating current motor.

While particular embodiments of the invention have been illustrated and described, it will be obvious that various changes and modifications may be made without departing from the invention and it is intended to cover in the appended claims all such changes and modifications that fall within the true spirit and scope of the invention.

Having thus described my invention, what I claim as new and useful and desire to secure by United States Letters Patent, is:

1. In an electric motor the combination comprising a polyphase multi-pole stator winding and a squirrel-cage rotor having a plurality of bars arranged in groups with a discrete number of groups corresponding to the number of poles provided by each phase of the stator winding, said discrete groups being angularly spaced apart by an amount corresponding to the pole spacing.

2. In an electric motor, the combination comprising a polyphase multi-pole stator winding and a squirrel-cage rotor having a winding comprising a plurality of bars arranged in groups with a discrete number of groups corresponding to the number of poles provided by each phase of the stator winding, said discrete groups being angularly spaced apart by an amount corresponding to the pole spacing, and one of said windings being skewed relative to the axis of rotation of said rotor.

3. In an electric motor, the combination comprising a polyphase multi-pole stator winding and a squirrel-cage rotor having a plurality of bars skewed relative to the axis of rotation of said rotor and arranged in groups with a discrete number of groups corresponding to the number of poles provided by each phase of the stator winding, said discrete groups being angularly spaced apart by an amount corresponding to the pole spacing.

4. In an electric motor, the combination comprising a first polyphase multi-pole stator winding, a second polyphase stator winding, a squirrel-cage rotor having a plurality of bars arranged in groups with a discrete number of groups corresponding to the number of poles provided by each phase of the first stator winding, said discrete groups being angularly spaced apart by an amount corresponding to the spacing of the poles provided by said first winding.

5. In an electric motor, the combination comprising a first polyphase multi-pole stator winding, a second polyphase stator winding, and a squirrel-cage rotor having a plurality of bars skewed relative to the axis of rotation of said rotor and arranged in groups with a discrete number of groups corresponding to the number of poles provided by each phase of said first stator winding, said discrete groups being angularly spaced apart by an amount corresponding to the spacing of the poles provided by the first stator winding.

6. An angular movement transmitting device comprising a stepping-type motor having a polyphase multi-pole stator winding and a squirrel-cage rotor having a discrete number of rotor bars corresponding to the number of poles of said stator winding, and means including switching means for selectively energizing individual phases of said stator winding with single-phase electrical energy.

7. An angular movement transmitting device comprising a stepping-type motor having a polyphase multi-pole stator winding and a squirrel-cage rotor having a discrete number of rotor bars corresponding to the number of poles of said stator winding, and means including motor for successively energizing at a selectively variable rate not exceeding a speed corresponding to 70 percent of synchronous speed individual phases of said stator winding with single phase electrical energy.

8. An angular movement transmitting device comprising a stepping motor having a polyphase multi-pole stator winding and a squirrel-cage rotor having a discrete number of rotor bars corresponding to the number of poles of said stator winding, said bars being skewed relative to the axis of rotation, and means including a motor for energizing successively adjacent single phases of said stator winding at a selectively variable rate not exceeding a speed corresponding to 70 percent of synchronous speed with single-phase electrical energy.

9. A combined motor and angular movement transmitting device comprising a polyphase multi-pole stator winding, a second polyphase stator winding, a squirrel-cage rotor having a discrete number of rotor bars corresponding to the number of poles of the first stator winding, and means including first switching means for selectively energizing individual phases of said first stator winding with single-phase electrical energy for stepping motor operation, and means including second switching means for selectively energizing said second stator winding with polyphase energy for induction motor operation when said first winding is de-energized.

10. A combined motor and angular movement transmitting device comprising a first polyphase multi-pole stator winding, a second polyphase stator winding, a squirrel-cage rotor having a discrete number of rotor bars corresponding to the number of poles of said first stator winding, means including a variable speed motor for energizing successively, at a selectively variable rate less than a speed corresponding to 70 percent of the synchronous speed of said first stator winding, adjacent single phases with single-phase electrical energy when said second stator winding is de-energized for operation as a stepping-type motor, and means for energizing said second stator winding with polyphase electrical energy when said first stator winding is de-energized for operation as an induction motor.

11. A device in accordance with claim 10 wherein said rotor bars are arranged in groups of one or more bars skewed relative to the axis of rotation, said groups being angularly spaced apart by an amount corresponding to the spacing of the poles of said first stator winding.

References Cited in the file of this patent

UNITED STATES PATENTS

| | | |
|---|---|---|
| 920,898 | Abtmeyer | May 11, 1909 |
| 1,014,001 | Hitner | Jan. 9, 1912 |

OTHER REFERENCES

Standard Handbook for Electrical Engineers, sixth edition, McGraw-Hill, New York, 1933, p. 841, Fig. 168; pp. 851–52, section 7–345.

Jackson, D. C. and J. P.: "Alternating Currents and Machinery," MacMillan Co., New York, 1914, pp. 863–64.